United States Patent [19]

Malkki

[11] Patent Number: 5,027,347
[45] Date of Patent: Jun. 25, 1991

[54] INTERCOM SYSTEM

[76] Inventor: Heikki Malkki, Tervaniementie 1, SF-02820 Espoo, Finland

[21] Appl. No.: 358,684

[22] Filed: May 30, 1989

[30] Foreign Application Priority Data

Jun. 10, 1988 [FI] Finland .................. 882788

[51] Int. Cl.$^5$ .................. H04M 7/00; H04Q 11/04
[52] U.S. Cl. .................. 370/62; 370/24; 370/58.2; 370/94.3; 379/159; 379/172; 379/250; 379/284
[58] Field of Search .................. 370/58.1, 24, 62, 94.3, 370/58.2, 58.3, 94.1, 29, 77; 379/250, 284, 289, 171, 172, 158, 159, 160, 202

[56] References Cited

U.S. PATENT DOCUMENTS

| | | | |
|---|---|---|---|
| 3,824,344 | 7/1974 | James et al. .................. | 179/1 CN |
| 3,889,067 | 6/1975 | Reed et al. .................. | 379/250 |
| 4,097,690 | 6/1978 | Kuntz et al. .................. | 379/250 |
| 4,203,011 | 5/1980 | Coviello .................. | 379/159 |
| 4,258,236 | 3/1981 | Conklin et al. .................. | 379/250 |
| 4,397,030 | 8/1983 | Becker et al. .................. | 370/24 |
| 4,573,151 | 2/1986 | Jotwani .................. | 370/58.2 |
| 4,637,035 | 1/1987 | Betts .................. | 370/58.2 |
| 4,710,769 | 12/1987 | Friedman et al. .................. | 370/58.2 |
| 4,782,515 | 11/1988 | Phillips et al. .................. | 379/172 |
| 4,792,970 | 12/1988 | Molnar .................. | 379/284 |
| 4,809,260 | 2/1989 | Davidson et al. .................. | 370/58.2 |
| 4,835,764 | 5/1989 | Sulzbacher et al. .................. | 370/24 |
| 4,893,310 | 1/1990 | Robertson et al. .................. | 370/58.2 |

FOREIGN PATENT DOCUMENTS

| | | |
|---|---|---|
| 0176437 | 4/1986 | European Pat. Off. . |
| 0218149 | 4/1987 | European Pat. Off. . |
| 0396685 | 9/1977 | Sweden . |
| 2027565 | 2/1980 | United Kingdom . |
| 2100552 | 12/1982 | United Kingdom . |
| 2126842 | 3/1984 | United Kingdom . |
| 2128446 | 4/1984 | United Kingdom . |
| 2167623 | 5/1986 | United Kingdom . |

Primary Examiner—Douglas W. Olms
Assistant Examiner—Alpus H. Hsu
Attorney, Agent, or Firm—Young & Thompson

[57] ABSTRACT

The invention relates to an intercom system comprising a central unit and several remote stations connected by two-way lines to the central unit into a star network, whereby the lines are selectively interconnectable via the central unit for establishing a connection between desired remote stations. The number of simultaneous connections can be increased and the speech signals can be more reliably passed to the right remote stations when the two signal directions of each line are separated from each other at the central unit and the connection is established by connecting each signal direction separately.

7 Claims, 4 Drawing Sheets

INTERCOM SYSTEM

The invention relates to an intercom system comprising a central unit and a plurality of remote stations connected to the central unit by two-way lines into a network with a star configuration.

More particularly, the present invention is concerned with intercom systems intended to be used as procom systems. Such procom systems are used, e.g., in theatres where the stage manager gives real-time instructions during performance concerning the use of the lights and effects and other backstage operations.

In a conventional procom system, which does not comprise any selection function, all the remote stations are interconnected, so that all instructions given are received at all remote stations. This is a drawback since each user has to listen to the commands continuously and pick up those which concern him directly.

On the contrary, another conventional, intercom comprises a selection function, whereby the number of simultaneous speech connections is limited, in addition to which the remote stations can receive one call at a time only. Therefore the use of intercoms in procom systems is inconvenient.

It is also known to provide the procom system with preselection groups, whereby it is possible to preselect groups of several remote stations at the central unit, so that each group is behind the same channel. The system, however, is inconvenient in use, because the desired grouping has to be made separately for each performance, and if the groups are to be altered, this requires operations at the central unit. Moreover, when speech connection is switched to one of the groups, remote stations belonging to this particular group cannot receive from the other remote stations. In this prior art system, lines to the remote stations in one group are directly connected together, as a result of which the input impedances of the remote stations are connected in parallel, thus decreasing the total input impedance present at the calling remote station and degrading the quality of the signal.

SUMMARY OF THE INVENTION

The object of the present invention is to provide an intercom system suited for use as a procom system, in which the number of simultaneous and overlapping connections is unlimited and which avoids the above drawbacks.

According to the basic idea of the invention, a connection is established between two or more lines via the central unit in response to selection information received from a remote station in such a manner that the two directions of speech of each line are separated from each other at the central unit and the connection is established by connecting each direction of speech separately. This enables an unlimited number of simultaneous connections to the same line without that the connections would substantially interfere with each other.

In an intercom system according to one aspect of the invention, the inbound and the outbound audio-frequency signals are separated to different signal buses at the central unit at an interface between the central unit and the two-way line. For each two-way line there is provided an inbound signal bus and an outbound signal bus within the central unit. Connection from one remote station to another is established in such a way that the inbound signal bus corresponding to the calling line is connected to the outbound signal bus corresponding to the other line, and the outbound signal bus corresponding to the calling line is connected to the inbound signal bus of the other line. If the remote station dials several selection numbers for establishing several simultaneous connections, the signal buses corresponding to the line of this particular remote station are connected as mentioned above separately to the signal buses of all selected lines. Since the signal directions are separated from each other at the central unit, the speech signal from the calling station is heard at each remote station connected thereto, whereas the remote stations cannot hear each other. For the same reason, the number of simultaneous connections does not affect the impedance of any one of the lines, wherefore the sidetone null, for instance, is not deteriorated. In the system of the invention, the lines are never busy, but the signal buses corresponding to a new calling remote station are connected to the signal buses of the called line, irrespective of whether or not it is already connected to some other remote station. Thereby an instruction given by an operator at the new remote station is heard only at the remote station for which it is meant.

Consequently, each line can be connected simultaneously to every one of the other lines, if desired. As compared with a conventional procom comprising no selection function, the system of the present invention is considerably more extensive, since there is no unnecessary traffic at the remote stations and since each user hears only instructions which concern him directly.

According to another aspect of the invention, the two signal directions of each connection are first separated from each other at the central unit, then digitized, and connected on a time-division multiplex basis as separate digital signals.

The other aspect of the invention implies that when an analog signal from each line is digitized into digital samples, these samples can be transmitted on a time-division multiplex basis between the interface units of predetermined lines via a common data bus in response to the selection information. Digital samples applied to the interface units are converted to an analog outbound signal which is applied to the line. If any one of the lines is connected to more than one of the other lines, the digital samples of these other lines are summed, and the sum value is applied to the interface unit of the line in question to be converted to an analog signal. The switching means and the complicated background wiring used in the intercom system according to the first aspect of the invention can be replaced by a few digital buses common to all the lines and with a signal processing equipment which performs the transmission of digital samples between the lines as well as the necessary summing operations. The signal processing equipment also monitors the selection information from the lines and dynamically changes the connections between the lines in response to this information.

When using the method of the invention, the number of components required at the central unit can be considerably decreases with a resultant reduction in the manufacturing costs and price of the central unit.

BRIEF DESCRIPTION OF THE DRAWINGS

In the following the invention will be described in more detail by means of an embodiment with reference to the attached drawings, wherein.

DETAILED DESCRIPTION OF THE INVENTION

Figure 1:
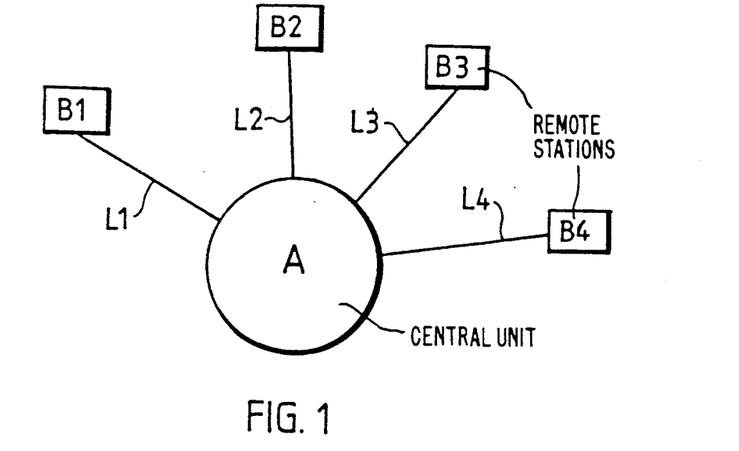
FIG. 1 shows the block diagram of an intercom system with four lines.

FIG. 1 shows an intercom system comprising four remote stations B1-B4 connected to a central unit via a two-way line L1, L2, L3 and L4, respectively. Each one of the lines L1-L4 preferably consists of a two-conductor or three-conductor cable. In a two-conductor cable, one conductor is an earth conductor while the other conductor is intended to serve as a signal conductor, in addition to which power supply to the remote stations B1-B4 from the central unit A can take place therethrough. In a three-conductor cable, the first conductor is an earth conductor, the second a signal conductor and the third is intended for said power supply. Although from now on only embodiments utilizing a three-conductor cable are referred to, the intention, however, is not to restrict the invention to this alternative.

As to their signal processing part, the remote stations B1-B4 may be similar to prior art remote stations, such as the remote station RS-501 supplied by Clear-Com Intercom Systems Inc. The remote station used in the invention can, for instance, be formed of the RS-501 remote station by furnishing it with the necessary selection means. These devices will be described in more detail in connection with FIG. 5.

Figure 2:
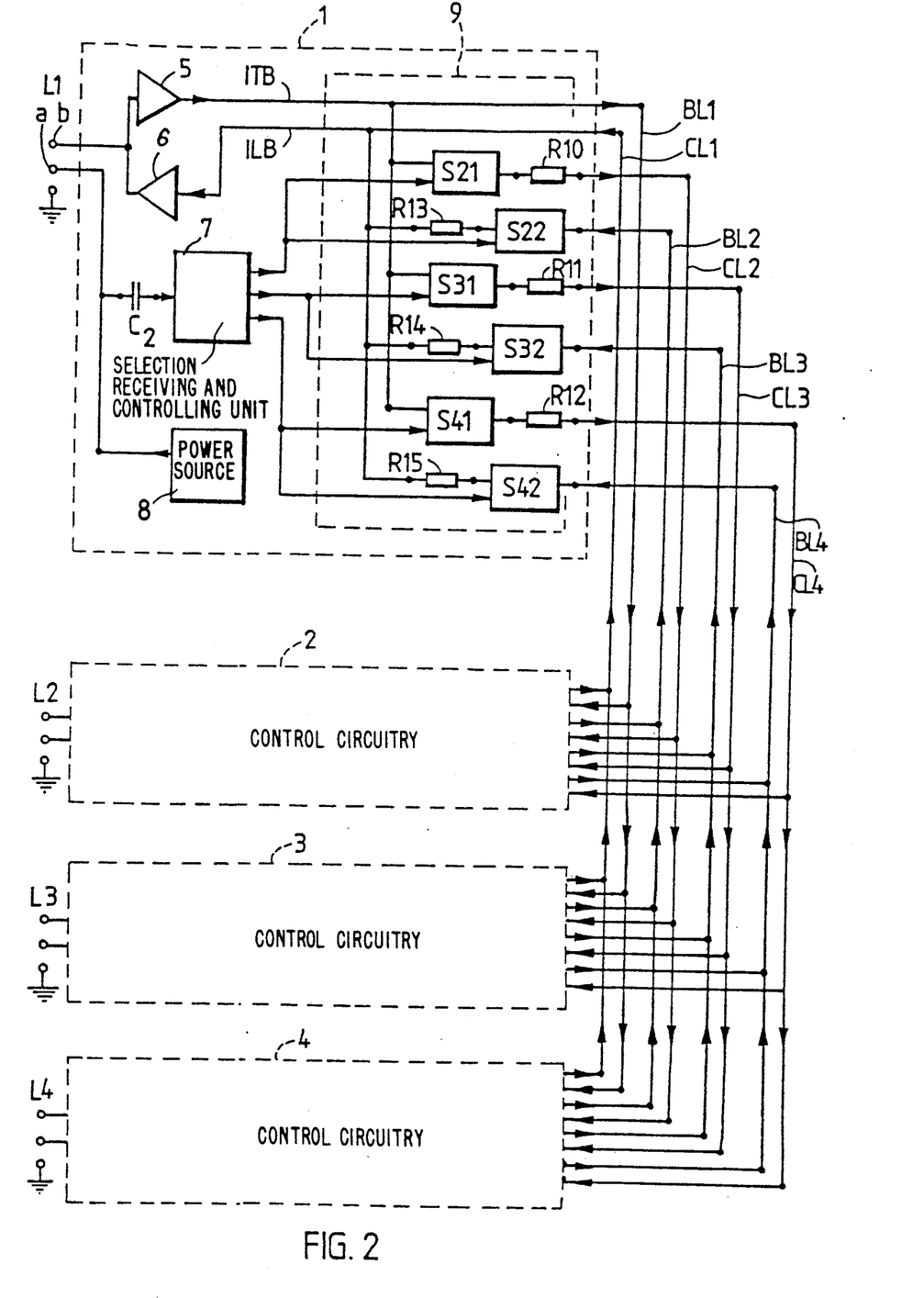
FIG. 2 shows the block diagram of a central unit of the invention, the central unit being applicable in a four-line intercom system.

FIG. 2 shows the block diagram of the central unit suited for use, e.g., in the four-line system illustrated in FIG. 1. FIG. 2 shows four blocks 1, 2, 3 and 4, which are substantially identical with each other, wherefore the block 1 only will be described more closely.

The block 1 has an input connected to the line L1 comprising a signal conductor b, a power supply conductor a, and an earth conductor. A signal is applied to the signal conductor b by an operational amplifier 6 having an output connected to the signal conductor b and an input connected to an outbound signal bus ILB for a signal to be applied to the line. A signal is applied to an inbound signal bus ITB for a signal from the line by an operational amplifier 5 having an input connected to the signal conductor b and an output connected to the inbound signal bus ITB. The function of the amplifiers 5 and 6 is to serve as a buffer between the internal signal buses and the two-way line L1 and to separate the signal directions of the two-way line L1. The separation of the directions of speech is accomplished by means of, e.g., a bridge connection shown in FIG. 3.

Figure 3:
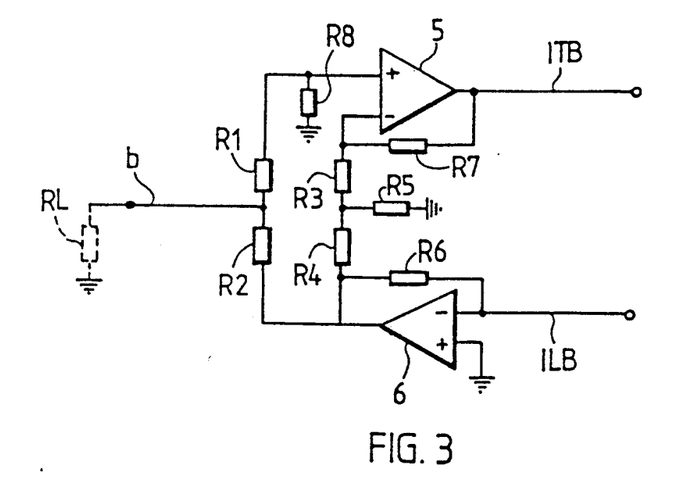
FIG. 3 shows the circuit diagram of a line connection means.

In FIG. 3, the amplifier 6 serves as a conventional inverting sum amplifier comprising a feedback resistor R6 between its output and input. The operational amplifier 5 serves as a differential amplifier having a feedback resistor R7 connected between its output and inverting terminal, and a resistor R8 connected between its non-inverting terminal and earth. A series connection of resistors R3 and R4 is coupled between the output of the amplifier 6 and the inverting terminal of the amplifier 5. Correspondingly, a series connection of resistors R1 and R2 is coupled between the output of the amplifier 6 and the non-inverting terminal of the amplifier 5. The connection point between the resistors R3 and R4 is coupled to earth through a resistor R5. The connection point between the resistors R1 and R2 is coupled directly to the signal conductor b of the two-way line. The value of the resistor R1 is preferably equal to that of the resistor R3; R2 is equal to R4; and R7 equal to R8. R5 is substantially equal to the line impedance $R_L$ of the line L1. The connection operates in the following way. When the amplifier 6 applies an outbound signal from the outbound signal bus ILB to its output, this signal appears with equal magnitude both at the connection point between the resistors R1 and R2 and at the connection point between the resistors R3 and R4. The same signal thereby appears at both terminals of the differential amplifier 5, and this signal does not pass to the output of the amplifier. The inbound signal from the signal conductor b of the line L1, instead, is visible at the non-inverting input terminal of the differential amplifier 5, whereby it is amplified and applied to the inbound signal bus ITB. A connection of the type described above for separating signal directions is generally used at remote stations in telephone systems and therefore known to those skilled in the art.

The signal buses ITB and ILB extend beyond the block 1, where they are designated BL1 and CL1, respectively.

Similar amplifiers 5 and 6 and internal signal buses ITB and ILB are provided for each other line L2 to L4. The signal buses ITB and ILB of the block 2 are designated BL2 and CL2 beyond the block. The signal buses of the block 3 are correspondingly designated BL3 and CL3 beyond the block, and the signal buses of the block 4 BL4 and CL4 beyond the block.

The signal bus ITB is further connected to a switch S21, S31 and S41. In addition, the switch S21 is connected through a resistor R10 to the outbound signal bus CL2 of the line L2; the switch S31 is connected through a resistor R11 to the outbound signal bus CL3 of the line L3; and the switch S41 is connected through a resistor R12 to the outbound signal bus CL4 of the line L4. Correspondingly, the signal bus ILB is connected to the switches S22, S32, S42 through resistors R13, R14 and R15, respectively. The switch S21, in turn, is connected to the inbound signal bus BL2 of the line L2; the switch S32 is connected to the inbound signal bus BL3 of the line L3; and the switch S42 is connected to the inbound signal bus BL4 of the line L4.

In FIG. 2, a conventional power source 8 is connected to the power supply conductor a of the line L1. The conductor a is further connected through a capacitor C2 to an input in a selection receiving and controlling unit 7. The receiving and controlling unit 7 comprises three control outputs one of which is connected to the control inputs of a pair of switches S21 and S22 while the other is connected to the control inputs of a pair of switches S31 and S32 and the third to the control inputs of a pair of switches S41 and S42.

The blocks 2-4 of the other lines L2-L4 correspondingly contain a power source 8, the receiving and controlling unit 7 and six switches S21-S42, that is, one pair of switches for each one of the other lines. However, it is to be noted that in the case of the block 2, e.g., the signal buses BL2 and CL2 belong to the line L2, which is connected directly to them instead of being connected through switches. Therefore the switch S21 in the block 2 could be connected between the outbound signal bus ILB and the outbound signal bus BL1 of the line L1.

Assume that a connection is to be made from a remote station connected to the line L1 to a remote station connected to the line L4. The remote station thereby sends selection information via the power supply conductor a of the line L1, which information contains the selection code of the line L4 and which is received by the receiving and controlling unit 7. In response to the received selection information, the controlling unit 7 applies a control signal to the switches S41 and S42, and the control signal switches on these switches. The switch S41 thereby forms a signal path from the inbound signal bus ITB of the line L1 to the outbound signal bus CL4 of the line L4. Inbound signal from the line L1 is thereby able to pass through the block 4 directly to the line L4 in the form of outbound signal. Correspondingly, the switch S41 forms a signal path from the inbound signal bus BL4 of the line L4 to the outbound signal bus ILB of the line L1. Thereby inbound signal from the line L4 is able to pass directly via the block 4 to be transmitted to the line L1. In this way a two-way connection is established between the lines L1 and L4.

Assume further that a remote station connected to the line L3 is now to be connected to a remote station connected to the line L1. The remote station connected to the line L3 thereby sends selection information which is received by the receiving and controlling unit 7 in the block 3. In response to the received information, the receiving and controlling unit controls two switches such that they connect the inbound signal bus ITB (not shown) of the line L3 to the outbound signal bus of the line L1 and the outbound signal bus ILB of the line L3 to the inbound signal bus BL1 of the line L1. Inbound signal from the line L3 thereby passes via the outbound signal bus CL1 of the block 7 to the line L1. The signal is not at any stage applied to the line L4 already connected to the line L1, so that it does not unnecessarily interfere with the remote station connected thereto. Correspondingly, inbound signal from the line L4 is not at any stage applied to the line L3 since the signals pass on different paths to the line L1. Instead, the signal from the line L1 passes on the inbound signal bus BL1 of the line L1 simultaneously to the line L3 and the line L4. If the remote station connected to the line L3 wishes to be heard also at the remote station belonging to the line L4, it has to send selection information to the block 3, which information contains the selection code of the line L4 and on the basis of which the signal buses ITB and ILB of the line L3 are connected to the signal buses BL4 and CL4 of the line L4, too. In this way, it is possible to form an arbitrary number of different connections between the remote stations. The connection can be advantageously cancelled by sending again the selection code of the established connection.

Figure 4:
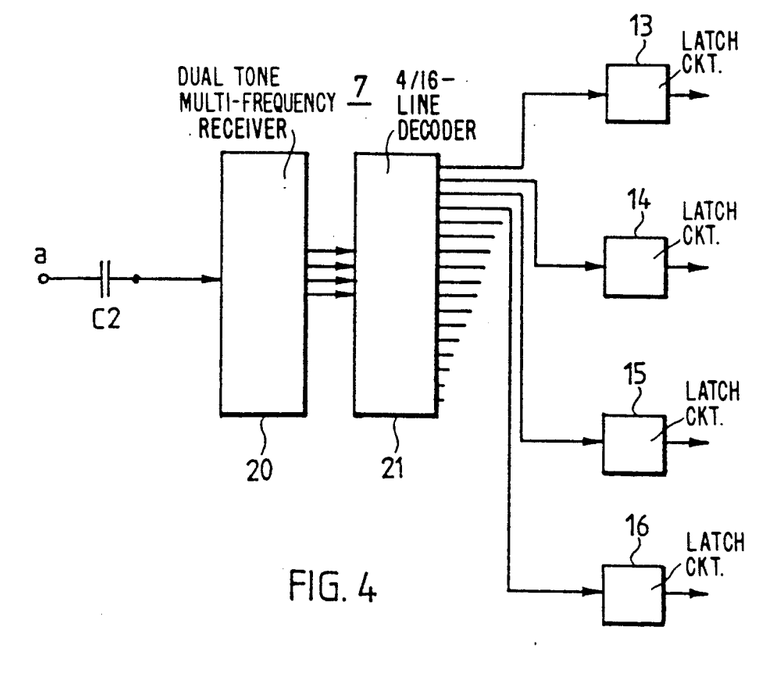
FIG. 4 shows the circuit diagram of a receiving and controlling unit.

FIG. 4 shows one possible selection receiving and controlling unit 7 of the invention, comprising a dual tone multifrequency receiver 20 which converts a audio-frequency signal pair received at the input from the power supply conductor a into a BCD number which is applied to the outputs of the receiver 20. The receiver is used in the field of telephone technology and known to one skilled in the art. Suitable receivers include the model MT8870 of Mitel Inc. The BCD output of the receiver 20 is connected to a 4/16-line decoder 21 which activates one of its 16 outputs in response to the BCD input. The first four outputs of the decoder 21 are connected to serve as inputs for latch circuits 13–16 while the output of each latch circuit forms one of the control outputs of the controlling unit 7. In the case of FIG. 4, it may be assumed that the outputs of the decoder 21 correspond to the line numbers 1–16 in the order from the top to the bottom, whereby the numbers from 1 to 4 are in use. A signal applied to the latch circuit activates the output of the latch circuit in question, which, in turn, activates the pair of switches connected to the output of the latch circuit. The pair of switches remains active until the following signal applied to the latch circuit inactivates the output of the latch circuit.

In order to reduce the number of the required components all the lines may be controlled by a common control means, i.e., a microprocessor, and the switches may be incorporated in a single integrated circuit.

The circuitry of FIGS. 2 and 4 is easy to extend so that it suits an intercom system comprising up to 16 lines by providing a new pair of switches and a latch circuit for each new line.

Figure 5:
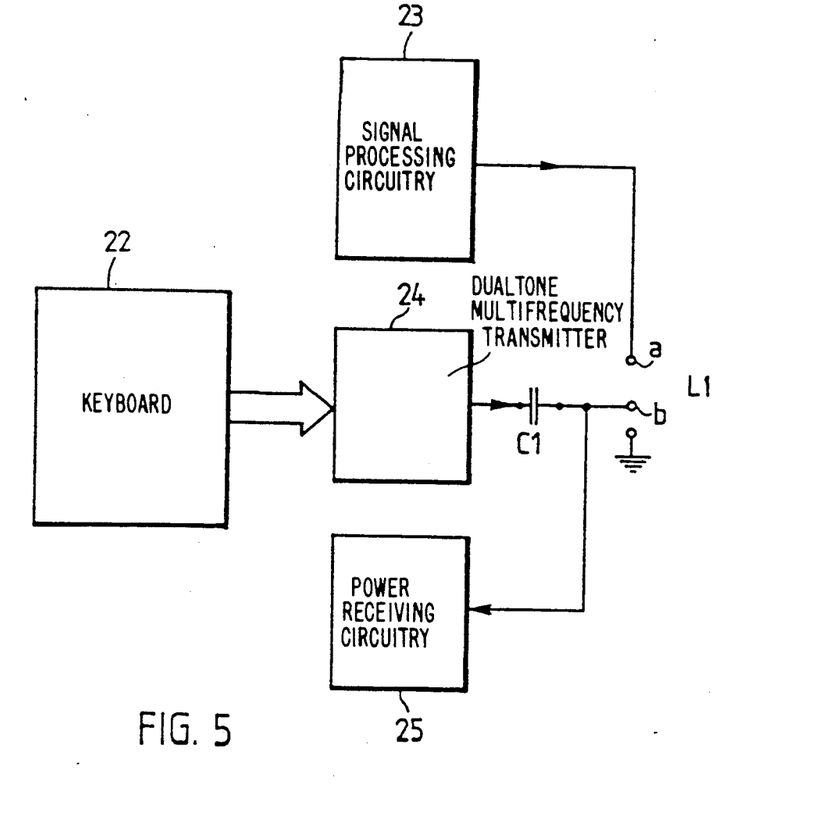
FIG. 5 shows the block diagram of a remote station suited for use in connection with the central unit of FIG. 4.

FIG. 5 shows a block diagram of a remote station suitable for use with the circuitry of FIG. 3. A block 23 illustrates a normal signal processing circuitry at a remote station of an intercom system, which circuitry is connected to the signal conductor b. A block 25 illustrates a circuitry which receives power supplied to the remote station through the power supply conductor a. The contents of the block 23 and the block 25 are obvious to one skilled in the art and do not fall within the scope of the invention. In the preferred embodiment of the invention, a block 24 is a dual tone multifrequency transmitter having an output connected through a capacitor C1 to the power supply conductor a. The transmitter 24 may be, e.g., of the type MK5089, supplied by Mitel, Inc. A keyboard 22 is connected to the transmitter 24. As is well-known to those skilled in the art, the pressing of a key in the keyboard 22 causes the transmitter 24 to produce a voice-frequency pair corresponding to the key, and the voice-frequency pair is transmitted to the central unit A through the power supply conductor.

Figure 6:
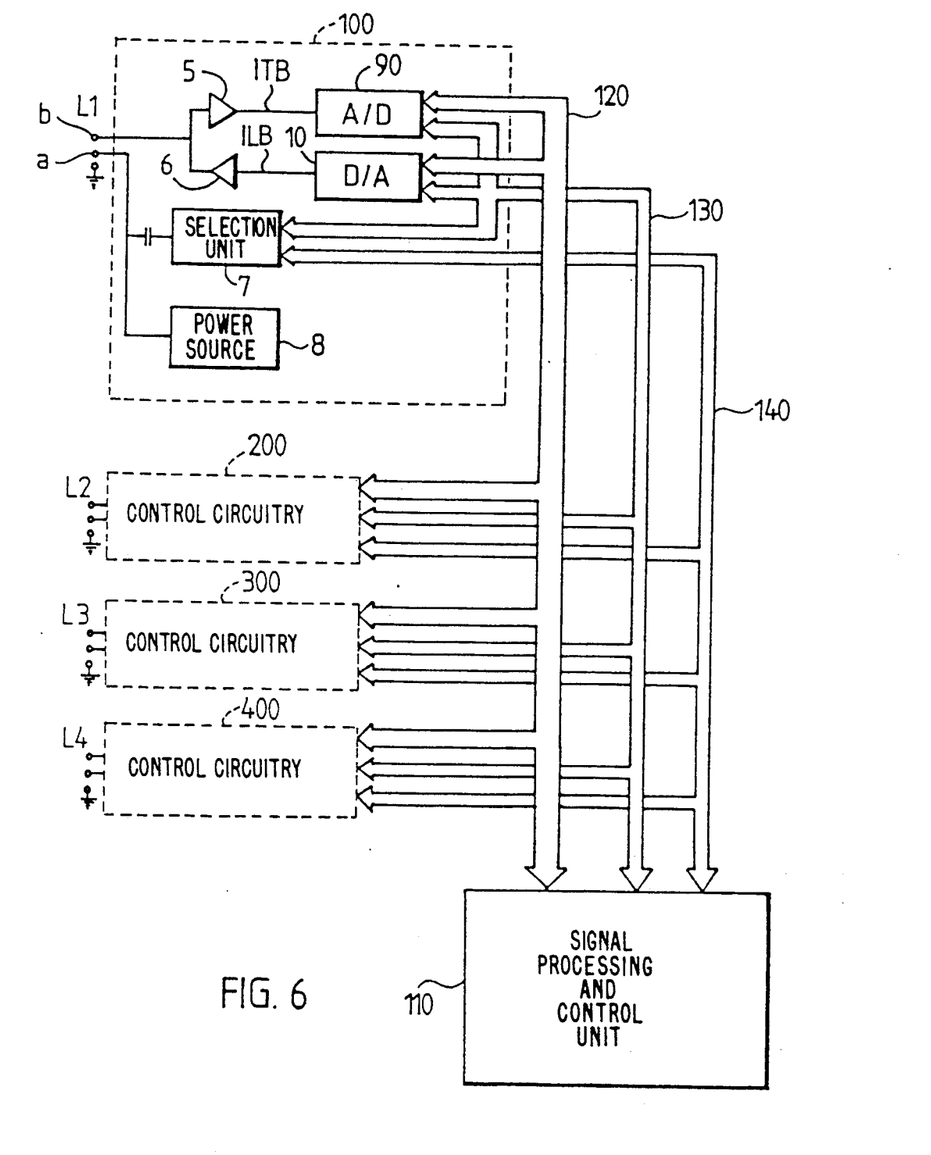
FIG. 6 shows the block diagram of another central unit of the invention suited for use in a four-line intercom system.

FIG. 6 shows the block diagram of another central unit of the invention, suitable for use, e.g., in a four-line system of FIG. 1. FIG. 6 shows four blocks 100, 200, 300, 400, which are substantially identical with each other, wherefore the block 1 only is described in more detail. Components provided with the same reference numerals are the same as in FIGS. 2 to 5.

An output in the operational amplifier 5 is connected to an input in an analog-to-digital (A/D) converter 90. A parallel digital output of the A/D converter 90 is connected to a parallel digital data bus 120 (e.g., 8 bits) and its address port is connected to an address bus 130 (e.g., 16 bits).

An input in the operational amplifier 6 is connected to an output in a digital-to-analog (D/A) converter 10. A parallel-shaped digital input in the D/A converter is also connected to the data bus 120 and its address port is connected to the address bus 130.

The block 1 further comprises the selection receiving unit 7 having an output connected to a selection data bus 14 and an enable input connected to the address bus 130.

The blocks 200-400 of the lines L2 to L4 contain corresponding components, which are similarly connected to a common data bus 120, to a common address bus 130 and to a common selection data bus 140.

The data bus 120, the address bus 130 and the selection data bus 140 are further connected to a signal processing and control unit 110.

The operation of the control unit 110 consists of consecutively reoccurring operational cycles each one of which contains at least a read interval and a write interval and preferably also a selection read interval for each line.

During the read interval, the control unit 110 reads via the data bus 120 the output of the A/D converter 90 of the line in question, which output is a digital sample value taken from an analog signal at the input of the A/D converter. The read sample values are stored temporarily in the memory of the control unit 110.

During the write interval, the control unit 110 forms a digital value from the sample values of one or more lines selected in accordance with the selection information. This digital value is applied to the D/A converter 10 of the line in question, and the D/A converter converts it into an analog signal to be applied to the outbound signal bus ILB. Said digital value is formed in accordance with the selection information for each line during the read interval from the digital sample of one line when the line is connected to one of the other lines only, or by summing the samples of several lines when the line is connected to several other lines.

In addition, the control unit may read, during the selection read interval, the selection receiving unit 7 of the line in question via the bus 140, and update the selection information in its memory. In this case, the control unit 110 reads regularly the output of the selection receiving unit 7 of each line. Alternatively, the receiving unit 7 may transmit an interrupt request signal to the control unit 110 when it receives a selection signal from the line, as a result of which the control unit 110 reads the selection information from one or more selection receiving units 7. This solution decreases the number of required read operations.

The number of both the read intervals and write intervals is preferably equal to that of the two-way lines. If the system, however, also contains lines with an outbound signal only (a so called public-address lines), the number of the write intervals is equal to the total number of the two-way lines and the public-address lines. The number of the selection read intervals preferably equals to that of the read intervals.

As mentioned above, the buses 120 and 140 are time-division buses common to all the lines L1 to L4. The control unit controls the use of the buses via the address bus 13 by activating the converter 90, 10 or the unit 7, depending on which one of them in each particular case is subject to a read or write operation.

Assume that there is initially no connection via the central unit. The control unit thereby performs continuously the above-described read operations; however, as there is no connection according to the selection information, no summing and writing operations are performed or a constant value is applied to the D/A converters.

Assume additionally that the remote station connected to the line L1 is to be connected to a remote station connected to the line L4. The remote station transmits the selection information through the power supply conductor a of the line L1, and the receiving unit 7 receives it. When the control unit 110 next time reads the output of the unit 7, it stores the selection information in its memory. During the next write interval of the line L1, the control unit 110 writes the digital sample read from the A/D converter 90 of the line L4 to the D/A converter 10 of the line L1, which converts it into an outbound analog signal. Correspondingly, the digital sample read from the line L1 is written on the D/A converter of the line L4 during the next write interval of the line. In this way, a two-way connection is obtained in which the signal directions are connected separately from each other. Assume further that the line L1 has similarly called the line L2, too. The control unit 110 thereby sums the digital sample values read from the lines L2 and L4 during each write interval of the line L1, and applies the value so obtained to the D/A converter 10 of the line L1. So the signal applied to the line L1 contains a signal from both the line L2 and the line L4. During each write interval of the line L2 and the line L4, respectively, the control unit 110 writes the sample value read from the line L1 to the respective D/A converter 10. As a result, the signal from the line L1 passes to the remote stations connected both to the line L2 and to the line L4 whereas there is no connection between the two last-mentioned. A connection is made between them only when a selection code of the other line is received from the line L2 or the line L3. An established connection is cancelled when the same selection code is received again from the line which originally sent the selection code which led to the connection.

The control unit preferably consists of a microprocessor. The control unit can also consist, e.g., of two processors, one of which controls the operation of the system while the other performs suming operations.

The attached figures and the description related thereto are only intended to illustrate the present invention. In their details, the method and the intercom system of the invention may vary within the scope of the attached claims. The connection of the digitized signals, for instance, can be carried out in other alternative ways, which are obvious to one skilled in the art on the basis of the present description. In the version described above, the signal directions are separated before the inbound signal is digitized. Alternatively, it is possible to first digitize both signals occurring on the line by the A/D converter 90 and separate the inbound signal direction digitally. This can be realized, e.g., by various digital echo suppression techniques.

I claim:

1. A method of dynamically establishing a connection between remote stations in an intercom system comprising a central unit and a plurality of remote stations connected to the central unit by two-way lines, said method comprising the steps of separating two signal directions of each line from each other at the central unit and, after receiving a selection signal from one of the lines, establishing a connection between said one line and another line identified by the received selection signal by switching the two separated signal directions separately and independently from any other existing connections of the lines to be switched, such that outgoing signals from plural remote stations directed to a common selected remote station will be summed upon reception at said common station, and such that an outgoing signal from any of said remote stations will be received at only those other remote station or stations directed by said selection signal to receive the outgoing signal.

2. An intercom system comprising a central unit and a plurality of remote stations connected by two-way lines to the central unit to form a network with a star configuration, the lines being interconnectable via the central unit for establishing a connection between desired remote stations in response to selection information received from the lines, communication in each line comprising an inbound signal to the central station and an outbound signal to a selected remote station, at least some of the remote stations comprising means for transmitting a selection information to the central station and said central station comprising means for receiving said selection information; the central unit comprising for each two-way line
  an internal inbound signal bus;
  an internal outbound signal bus;
  a line interface device for applying the outbound signal from the outbound signal bus to the line and for applying the inbound signal from the line to the inbound signal bus; and the central station further comprising
  switching means responsive to the selection information received from the lines for selectively connecting the inbound signal bus and the outbound signal bus of any of the lines to the outbound signal bus and the inbound signal bus of any other of the lines respectively to establish a separate two-way connection between each desired pair of the lines, the switching means being capable of simultaneously connecting inbound buses of at least two different lines to the same outbound signal bus of a third linea nd thereby summing the corresponding inbound signals, when simultaneously separate connections to said third line from each of said at least two different lines are determined by the selection information, said switching means operating such that outgoing signals from plural remote stations directed to a common selected remote station will be summed upon reception at said common station, and such that an outgoing signal from any of said remote stations will be received at only those other remote station or stations directed by said selection information to receive the outgoing signal.

3. An intercom system comprising a central unit and a plurality of remote stations connected by two-way lines to the central unit to form a network with a star configuration, the line being interconnectable via the central unit for establishing a connection between desired remote stations in response to selection information received from the lines, communication in each line comprising an inbound signal to the central station and an outbound signal to a selected remote station, at least some of the remote stations comprising means for transmitting a selection information to the central station and said central station comprising means for receiving said selection information; the central unit comprising for each two-way line
  an internal inbound signal bus;
  an internal outbound signal bus;
  a line interface device for applying the outbound signal from the outbound signal bus to the line and for applying the inbound signal from the line to the inbound signal bus; and the central station further comprising
  switching means responsive to the selection information received from the lines for selectively connecting the inbound signal bus and the outbound signal bus of any of the lines to the outbound signal bus and the inbound signal bus of any other of the lines respectively to form a two-way connection between the lines, said switching means comprising a pair of switching devices for each pair of the two-way lines, each pair of the switching devices being selectively controlled according to the received selection information independently of other pairs of switching devices, such that outgoing signals from plural remote stations directed to a common selected remote station will be summed upon reception at said common station, and such that an outgoing signal from any of said remote stations will be received at only those other remote station or stations directed by said selection information to receive the outgoing signal.

4. A method of establishing a connection between two remote stations in an intercom system comprising a central unit and a plurality of remote stations connected to the central unit by two-way lines, said method comprising the steps of
  transmitting a selection code from one of the remote stations on a first line,
  receiving said selection code at the central station,
  separating an inbound signal and an outbound signal of each one of the lines at the central station,
  transmitting the inbound signal of the first line as the outbound signal of a second line selected according to the received selection code and transmitting the inbound signal of the second line as the outbound signal of the first line, and
  when the second line already has a connection with at least one other line, summing the inbound signal of said at least one other line with the inbound signal of the first line for forming the outbound signal of the second line, such that outgoing signals from plural remote stations directed to a common selected remote station will be summed upon reception at said common station, and such that an outgoing signal from any of said remote stations will be received at only those other remote station or stations directed by said selection code to receive the outgoing signal.

5. An intercom system comprising a central unit and a plurality of remote stations connected to the central unit by two-way lines to form a star network, the lines being interconnectable in response to selection information received from the lines for establishing a connection between desired remote stations, communication in each line comprising an inbound analog signal to the central station and an outbound analog signal to the remote station, at least some of the remote stations comprising means for transmitting selection information to the central station and said central station comprising means for receiving said selection information; the central unit comprising for each line
  an interface means connected to the line for separating the inbound signal and the outbound signal;
  an A/D converter for converting the inbound analog signal into digital inbound samples;
  a D/A converter for converting a digital outbound value into an outbound analog signal and for applying it to the interface means; and said central unit further comprising a processing means common to all lines and connected to the A/D and D/A converters via a common time division multiplexed bus for reading the digital samples from the A/D converters during predetermined read intervals, for forming the digital outbound values from the read digital inbound samples and for writing the digital outbound vales to the D/A converters during predetermined write intervals according to the selection information, said processing means being capable of forming the digital outbound value for a line, which has simultaneous connection with at least two other lines, by summing the digital inbound samples of said at least two other lines, said processing means operating such that outgoing signals from plural remote stations directed to a common selected remote station will be summed upon reception at said common station, and such that an outgoing signal from any of said remote stations will be received at only those other remote station or stations directed by said selection information to receive the outgoing signal.

6. A system according to claim 5, wherein the central unit comprises a selection information receiver for each line, the receiver comprising an analog input connected to the line and a digital output connected to the processing means.

7. A system according to claim 5, wherein the processing means comprises a microprocessor.

* * * * *